US005763875A

United States Patent [19]

Kaesdorf et al.

[11] Patent Number: 5,763,875

[45] Date of Patent: Jun. 9, 1998

[54] METHOD AND APPARATUS FOR QUANTITATIVE, NON-RESONANT PHOTOIONIZATION OF NEUTRAL PARTICLES

[76] Inventors: Stefan Kaesdorf, Augustenstrasse 112, 80798 München; Matthias Wagner, Bauersfeldstrasse 8, D-07745 Jena-Winzerla; Hartmut Schröder, Rheinlandstrasse 15, 80805 München, all of Germany

[21] Appl. No.: 280,387

[22] Filed: Jul. 26, 1994

Related U.S. Application Data

[63] Continuation-in-part of Ser. No. 80,581, Jun. 21, 1993, Pat. No. 5,365,063, which is a continuation-in-part of Ser. No. 790,771, Nov. 12, 1991, abandoned.

[51] Int. Cl.$^6$ .......... B01D 59/44; H01J 49/00

[52] U.S. Cl. .......... 250/287; 250/282; 250/423 P

[58] Field of Search .......... 250/423 P, 281, 250/282, 287

[56] References Cited

U.S. PATENT DOCUMENTS

| | | | |
|---|---|---|---|
| 4,694,167 | 9/1987 | Payne et al. | 250/282 |
| 4,733,073 | 3/1988 | Becker et al. | 250/282 |
| 4,920,264 | 4/1990 | Becker | 250/282 |
| 5,160,840 | 11/1992 | Vestal | 250/287 |
| 5,202,563 | 4/1993 | Cotter et al. | 250/287 |
| 5,300,774 | 4/1994 | Buttrill | 250/287 |
| 5,365,063 | 11/1994 | Kaesdorf et al. | 250/288 |

OTHER PUBLICATIONS

"Can nonresonant multiphoton ionization be ultrasensitive?" by C.H. Becker and K. T. Gillen J. Op. Soc. Am. B/vol. 2, No. 9, Sep. 1985, 1438–1443.

*Primary Examiner*—Bruce C. Anderson
*Attorney, Agent, or Firm*—Handal & Morofsky

[57] ABSTRACT

A mass spectrographic method and apparatus provide simultaneous quantification of multiple target species of gaseous neutral particles that may be laser sputtered from a sample. The invention employs non-resonant multiphoton ionization of the target species with a high intensity laser beam propagated toward a given extraction volume from which volume ions are withdrawn for quantification. In preferred embodiments, the given volume is defined by an acceptance aperture and a transverse energy acceptance interval which is itself defined by energy discrimination of the ions into bunches with a novel ion mirror. An inventive embodiment of ion mirror has four grids at different spacings and potentials with a second grid away from the acceptance aperture having a potential just below a third to separate out an undesired, low-energy ion bunch. Curves for simultaneously quantifying $Ta^+$ ions with $Ta^{++}$ ions are shown.

13 Claims, 10 Drawing Sheets

METHOD AND APPARATUS FOR QUANTITATIVE, NON-RESONANT PHOTOIONIZATION OF NEUTRAL PARTICLES

CROSS-REFERENCE TO RELATED APPLICATIONS

This application is a continuation-in-part of U.S. patent application Ser. No. 08/080,581 of KAESDORF, filed Jun. 21, 1993 and entitled "METHOD AND APPARATUS OF QUANTITATIVE AND NON-RESONANT PHOTOIONIZATION OF NEUTRAL PARTICLES AND THE USE OF SUCH APPARATUS", which is U.S. Pat. No. 5,365,063 which, in turn, is a continuation-in-part of U.S. patent application Ser. No. 07/790,771 of KAESDORF, filed Nov. 12, 1991 and entitled "METHOD AND APPARATUS OF QUANTITATIVE NON-RESONANT PHOTOIONIZATION OF NEUTRAL PARTICLES AND THE USE OF SUCH APPARATUS", which is abandoned.

TECHNICAL FIELD

The present invention relates to a method and an apparatus for the quantitative ionization of neutral particles of a gas by means of a non-resonant laser beam. In this context, the term "gas" includes not only permanent gases but also vapors, sputtering products and the like. The neutral particles may be atoms, molecules as well as dimers and clusters, i.e., agglomerates of two or more atoms etc. The method and apparatus according to the invention are especially significant for analytical processes like SALI (Surface Analysis by Laser Ionization), SIMS (Secondary Ion Mass Spectroscopy) and the like, but they may be used quite generally wherever neutral particles are to be ionized within a designated space and as quantitatively as possible.

BACKGROUND

U.S. Pat. No. 4,733,073 (Becker 073) discloses a method for surface analysis in which the surface to be examined is bombarded by an ion beam and the liberated particles are ionized by non-resonant photoionization by means of a high-intensity laser beam parallel to the surface. The produced ions are analyzed by mass spectroscopy with a time-of-flight (TOF) mass spectrometer of a type known as "Reflectron".

Non-resonant (non-selective) ionization by means of high-power lasers makes possible the identification of substances with very high sensitivity, but simultaneous quantification, i.e., a quantitative analysis, has not heretofore been attainable. The above-cited PCT publication states that a saturation of ionization by non-resonant multi-photon ionization is possible but that is true only to a limited degree as shown by more thorough experiments and the cited publication also clearly suggests the semi-quantitative character of the described method. Pursuant to Becker's teaching at column 5, lines 52–60, quantitative analysis of relative amounts of atomic species can be achieved by measuring the signal levels at the saturation power density for the ionization of each chemical species. Such individual matching evidently requires multiple individual determinations to be run as individual passes through the system with a different laser intensity being selected for each pass. This is a tedious process which is impractical for large numbers of quantitative determinations.

In practice, exact quantification is not possible with the known non-resonant laser ionization methods because of the complicated ionization processes and the multitude of parameters, some of which depend on laser intensity. The term "quantification" refers to the possibility, for a given minimum laser intensity, of deriving the concentration of a substance (element) within a given spatial region ("test volume") from the corresponding ion intensity (i.e., an ion signal).

An important aspect of modern TOF design is an ability to compensate for the energy spread in order to obtain high mass resolution. The flight time dispersion functions of such spectrometers exhibit a more or less pronounced flatness in the vicinity of the mean ion energy. Several systems based on the principle of ion retroreflection in an electrostatic mirror (reflectron TOF) have been described in the literature. The aim of prior technical approaches was to obtain a high flatness of the dispersion curve for an ion energy interval as large as possible by using an ion mirror comprising accelerating and retarding electric fields. A drawback of such ion mirrors is that any improvement of the focusing capability reduces the ability to discriminate against the original location of the ion.

SUMMARY OF THE INVENTION

The invention, as claimed, is intended to provide a remedy. It solves the problem of further developing a method for ionizing multiple species of neutral gas particles by non-resonant laser radiation to guarantee quantitative ionization of neutral particles. In a given spatial volume the laser beam (in the given volume) has an intensity above the saturation intensity of ionization (saturation regime) of each such multiple species. The ionizing laser can have a beam profile with very steep flanks. The produced ions are aspirated by an ion-optical system whose acceptance region, at least in the direction of propagation of the laser beam, is limited to the region in which the laser beam conforms to the above conditions.

The reason for the sharp lateral limitation of the test volume by using a laser beam with steep lateral intensity ramps to above the saturation intensity is that if, for example, the lateral variation of the laser beam intensity is Gaussian, i.e., follows a bell-shaped curve, which is approximately true for many high-power lasers, then the number of ions produced by the laser radiation increases with increasing beam intensity even if the maximum intensity is higher than the saturation intensity.

When the intensity of the laser radiation is increased, the ion density does not increase further in the region where the intensity is greater than the saturation intensity because all the particles are already ionized. However, in the flanks of the radiation profile, where saturation has not yet been attained, the ion density continues to increase so that no saturation of the ion signal, i.e., no signal plateau, is obtainable.

Because the ionization volume increases with increasing intensity, an absolute determination of the ion density in the test volume is possible only with extremely complex apparatus even if the measurements are taken at a fixed laser intensity which is above the saturation intensity. This will be explained for the case where several types of neutral particles having different ionization action cross-sections are ionized, with the aid of the definition of an "effective test volume".

The total number $N_i$ of ions of particle type i, which, after ionization, pass through the laser beam of the ion aspiration system can be written as:

$$N_i=n_i\int p_i(x,y,z)A(x,y,z)dxdydz \quad [1]$$

where $n_i$: particle density of the particle type i $p_i(x,y,z)$: probability that the particle type i will be ionized by the laser beam at location (x,y,z)

A(x,y,z): probability of acceptance

Integration is performed over the ionization space. A constant particle density in the ionization space was assumed and this condition is readily fulfilled as the ionization space usually has a spatial extent of only a few hundred μm. The integral has the dimension of volume and will be referred to hereinafter as the test volume $$V_{ieff}=\int p_i(x,y,z)A(x,y,z)dxdydz \quad [2]$$

If the laser beam profile does not have very steep flanks and if these flanks are still within the acceptance region of the ion aspiration system, then $p_i(x,y,z)$ is 100% in the saturation regime of the maximum beam profile. When the intensity is increased, the value of $p_i(x,y,z)$ continues to approach that value even at the edges, i.e., the effective test volume $v_{ieff}$ is enlarged.

The measurement of the absolute concentration $n_i$ of the particle type i is thus reduced to the determination of the associated effective test volume $V_{ieff}$ and the measurement of the value of $N_i$ of ions of type i which pass the ion aspiration system:

$$n_i=N_i/V_{ieff} \quad [3]$$

As the probability of ionization $p_i$ depends on both the laser intensity and the ionization action cross-section, the effective test volume $V_{ieff}$ is generally an individual property of the particle of type i and thus cannot be determined even with a calibration substance j of known density $n_j$ and known ionization probability $p_j(x,y,z)$. Therefore, previous methods of post-ionization quantification make it necessary, even in the case of saturation of ionization in the center of the beam profile, to measure the three-dimensional test volume to obtain an absolute determination of ion density and that measurement is technically very difficult.

Conditions are further complicated in that, in many instances, several competing ionization processes with varying intensity dependence produce the same ion type. For example, if the sample surface is metallic, then, e.g., dimers and other metal clusters are emitted during sputtering, in addition to metal atoms and, because of the interaction with the laser beam, atomic ions are produced both by ionization and by fragmentation of the dimers and metal clusters. As ion production via clusters is more efficient than ionization of atoms, the dimers and clusters are ionized before the atoms. If the steepness of the flanks of the laser beam is not great enough, then the cluster ionization will predominate overall even for the highest laser power because, even then, the regions of lower intensity at the flanks can still contribute to ionization.

The above described quantification problem is solved, according to the present method and apparatus, by confining the ion production and yield to a sharply limited spatial region by the use of a laser beam having an intensity profile with very steep flanks and by aspirating or detecting only ions from the spatial region in which the intensity is above the saturation intensity and where the laser beam has a steep-flanked intensity profile and where, especially, the process of direct ionization, which is easier to quantify, predominates. This spatial volume does not expand when the laser intensity increases so that the number of ions produced in dependence on laser intensity reaches a plateau in the saturation regime.

For absolute determinations, the size of the test volume in this case can be found by calibration measurements with a calibration substance, such as a noble gas, e.g., xenon, whose particle density can be measured simply and whose ionization process is driven into saturation. Knowledge of the ionization cross-section of the calibration substance is not necessary, however. It is sufficient to obtain a plateau to be able to use the number of measured ions and the normally known ion detection sensitivity of the ion detection device being employed, to determine the volume in question from the particle density, assumed known.

It is an essential feature of the invention that the sharp limitation of the test volume is obtained by a combination of light-optic al and ion-optical means. If the laser beam profile has very steep lateral intensity gradients, then the test volume does not have to be limited in that direction by means of the ion-optical part of the ion aspiration system, i.e., the extent of the ionization volume and the test volume are identical in the lateral direction.

Compared to the known method, namely to limit the test volume solely by use of the ion-optical means of the aspiration system, the present method therefore has the advantage that the steps required for quantification of the ionization do not lead to a reduction of the number of aspired ions. In this way, the high sensitivity of this method of ionization remains intact. In the direction of the laser beam, the test volume must be limited by the ion-optical means if the laser beam does not conform everywhere along its direction of propagation to the above named conditions of intensity and intensity profile.

BRIEF DESCRIPTION OF THE DRAWINGS

Some ways of carrying out the invention are described in detail below with reference to the drawings which illustrate some embodiments of the invention and in which.

DESCRIPTION OF THE PREFERRED EMBODIMENTS

In what follows, the first description will be of the technical methods that can be used for obtaining a sharply limited test volume. The laser beam profile may be optimized by modification of the laser itself or by external means. The first method includes the use of a so-called "unstable" resonator which leads to an increase of intensity at the edges of the beam profile and insures steep flanks in the emitted laser light. If this beam is focussed with aberration-corrected focussing optics, the beam profile is unchanged, i.e., the bundled laser beam also has the desired characteristics. If the flanks of the emitted laser beam are not sufficiently steep, that may be corrected by diaphragms or masks that block the regions of low intensity and/or by the focussing optics. In that case, it is necessary to use focussing optics that generate aberrations during the bundling of the laser beam and thus modify the beam profile, as will be explained in more detail with reference to FIG. 4.

Figure 1:
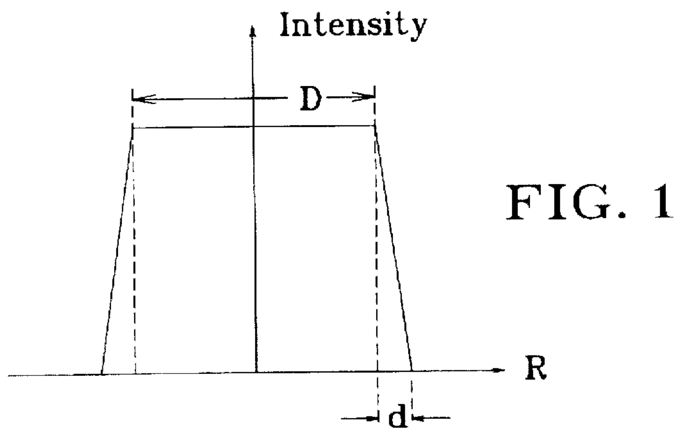
FIG. 1 is a schematic representation of an intensity profile of a laser beam.

The degree of steepness required of flanks of the beam profile depends on the precision with which the absolute ion density in the test volume must be determined. If the ionization cross-sections of the calibration substance and of the test substance are drastically different, then the largest relative error made during the determination of the absolute ion density in the test volume is given by the ratio of the volume defined by the flanks of the beam profile to the magnitude of the volume, with saturation being always achieved. If a precision G of 10% is required then, for a trapezoidal beam profile with radial symmetry according to FIG. 1, $$G=\pi\cdot D\cdot d/(\pi D^2/4)=1/10 \text{ or } d<D/40$$

Figure 2:
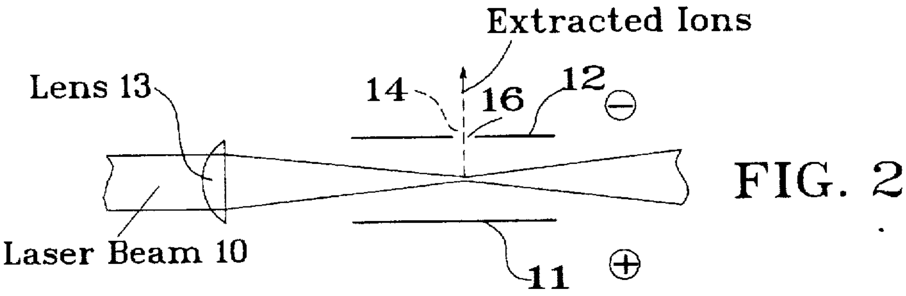
FIG. 2 is a schematic representation of a first example of an ion aspiration system.
Figure 3:
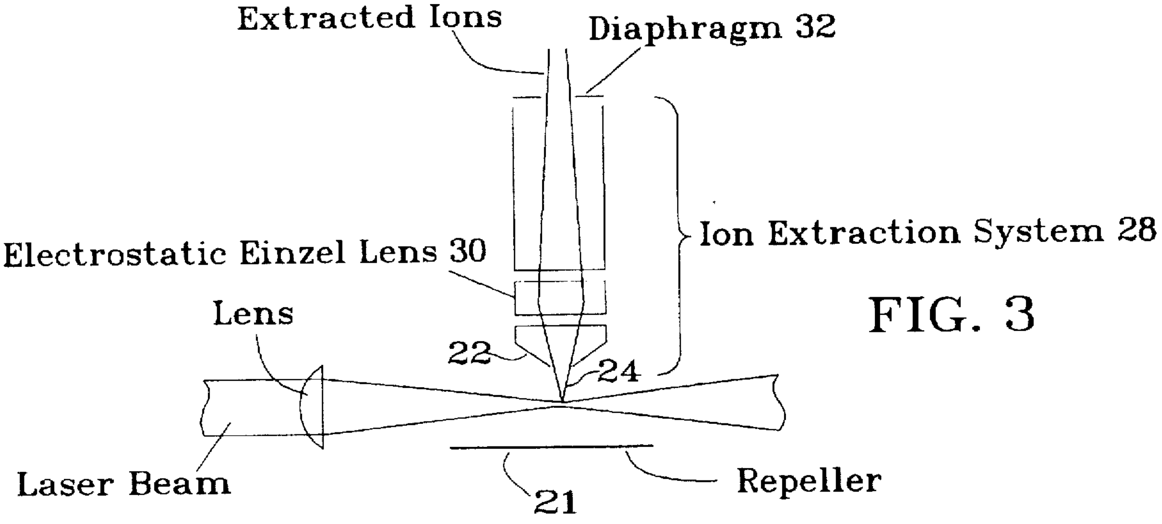
FIG. 3 is a schematic representation of an alternative example of an ion aspiration system.

FIGS. 2 and 3 show means for defining the test volume with the aid of ion-optical devices of the ion aspiration systems. In FIG. 2, the ions are produced by a laser beam 10 in a plate capacitor formed, for example, by a flat surface of a sample 11 and by a parallel plane plate 12 and within which exists a homogeneous electric field. The laser beam 10 extends parallel to the electrodes of the plate capacitor 11, 12 and is focussed by a lens 13 into the interior of the plate capacitor. The borders of the test volume in the plane perpendicular to the beam 14 of emerging ions are formed by an opening 16 in the negatively charged plate 12. As the ion-optical construction has unlimited acceptance in the direction of the emerging ion beam, any limitation of the test volume in that direction can occur only by energy selection of the aspirated ions. This energy selection may be performed by an energy spectrometer (e.g., a spherical capacitor type spectrometer of a cylindrical mirror analyzer) mounted behind the drain electrode (plate 12) or, for example, by time-of-flight analysis of the aspirated ions in the case of pulsed ionization.

In the alternative apparatus of FIG. 3, the ions 24 are aspirated by the electric field between a repeller electrode 21 formed, for example, by the probe and an input electrode 22 of an ion extraction system 28 and subsequently imaged ion-optically by a single electrostatic lens 30 on a diaphragm or mask 32. The size of the mask opening thus determines the borders of the test volume. In the direction of the extracted ion beam 24, the test volume is limited by the finite depth of field for the ion-optical image and/or by energy selection. In this case, the lateral ion-optical limitation of the test volume is thus accomplished by diaphragms in the ion-extraction system.

If the laser beam intensity distribution exhibits a structure within the test volume, an increase of laser beam intensity may cause an inward expansion of the test volume which detracts from an exact quantification for the reasons cited above. If the laser beam has a structured intensity distribution, i.e., it exhibits one or more intermediate minima, then the intensity in the minima must be higher than the saturation density or, for very steep intensity gradients, either the intensity in the minima must always be negligibly small for all possible intensities of the post-ionization laser beam or else it must always be above the saturation intensity.

Figure 4:
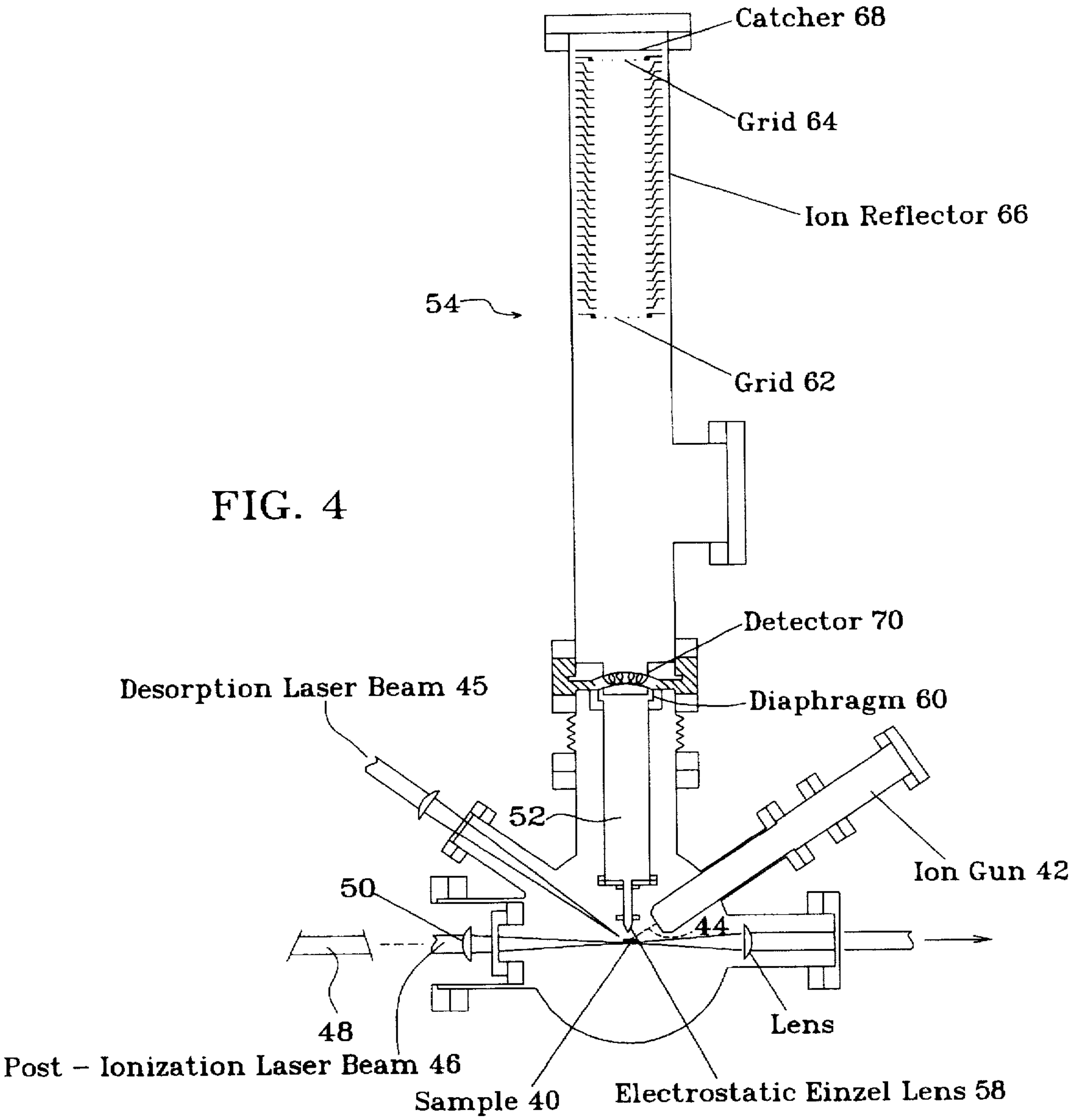
FIG. 4 is an exemplary embodiment of an apparatus for carrying out the method of the invention.

The apparatus shown in FIG. 4, for examining the surface of a sample 40 includes an ion gun 42 for generating an ion beam 44 directed onto the surface of the sample to be analyzed for removing ("sputtering") material from the sample surface. Alternatively, material may be removed from the sample surface by means of a desorption laser beam 45. The neutral component of the sputtered particles is ionized by interaction with laser beam 46 parallel to the sample surface, produced by a KrF laser 48 shown only schematically and focussed near the sample surface by focussing optics 50 shown for simplicity as a lens. The ions so produced are extracted by an ion extraction module 52 and analyzed in a mass spectrometer 54.

The focusing optics 50 not only bundle the laser beam but also modify its beam profile so that the intensity gradients of the focussed laser beam are as steep as possible within a predetermined volume. The focussing optics 50 may contain or consist of hard and/or soft diaphragms and/or other suitable elements such as lenses. They are so configured that the probe does not enter the laser beam.

Figure 5:
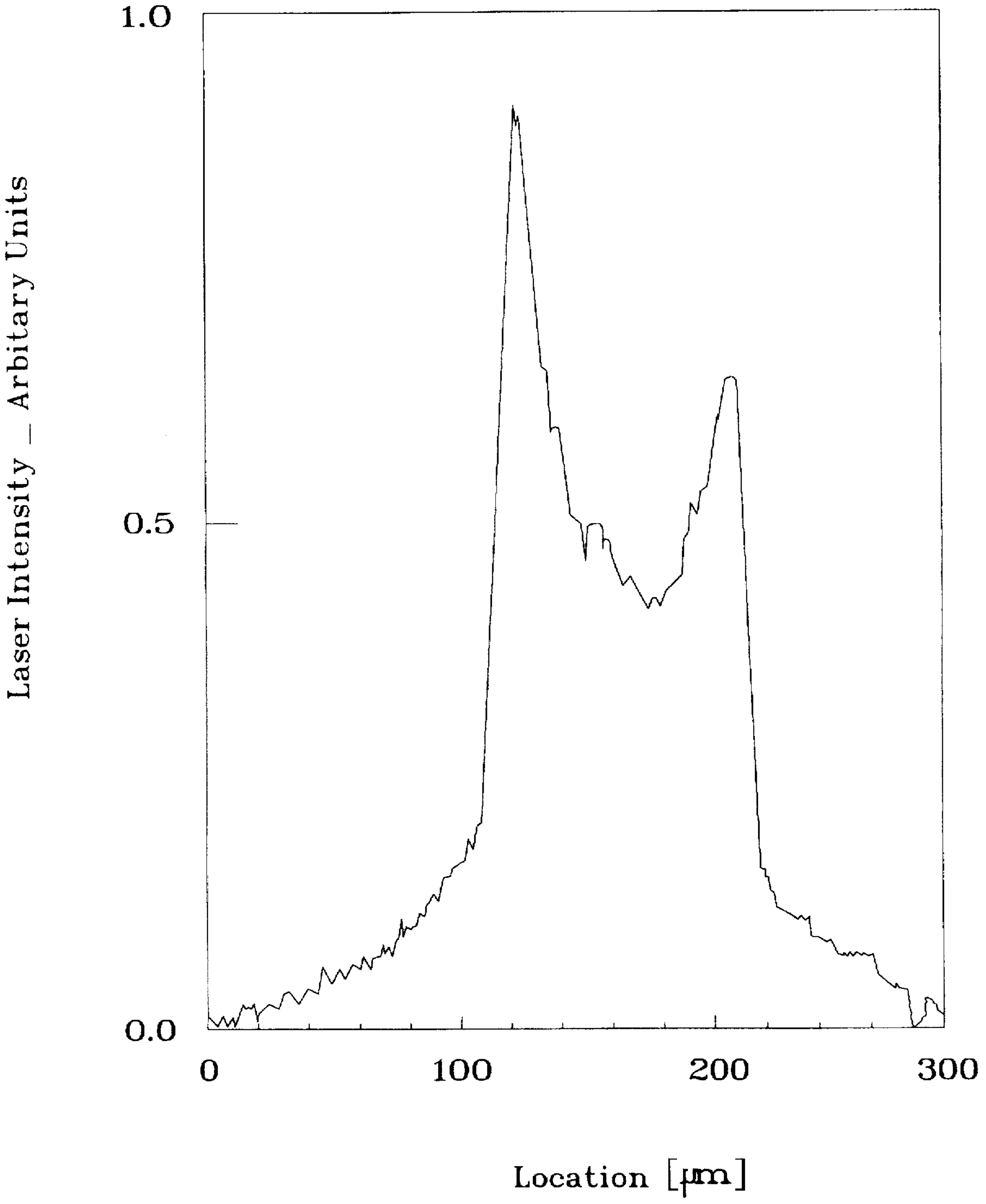
FIG. 5 shows the lateral intensity distribution of a post-ionization laser beam in the ionization chamber.

A suitable beam profile is shown in FIG. 5. It contains two peaks between which lies a relative intensity minimum. The intensity in the minimum should be above the saturation intensity. The sharp peaks of the intensity profile according to FIG. 5 which create the steep flanks of the beam profile may be produced by the spherical aberration of a plano-convex focussing lens and represent the edge caustic of the focussed laser beam. The limited lateral acceptance of the ion extraction system (FIG. 3) limits the test volume in the direction of propagation of the laser beam to a region ahead of the smallest circle of confusion where the edge caustic occurs and where the intensity is still sufficient.

In a practical embodiment of the apparatus according to FIG. 4, the ion gun delivered an argon ion beam with an energy of 5 kV. The laser 48 was a pulsed KrF excimer laser whose beam 46 was focussed with a plano-convex lens 50 of focal length 180 mm. At its entrance, the ion extraction module contained a single electrostatic lens 58 and the ion-optical limitation of the test volume was obtained as in FIG. 3 by a diaphragm 60. The mass spectrometer was a time-of-flight mass spectrometer of the type 'Reflektron' and contained an ion reflector defined by grids 62, 64 a catcher 68 disposed at the grid 64 and an ion detector 70 disposed at the diaphragm 60.

The ion extraction module was disposed, relative to the focussing optics 50, that the only ions extracted were those produced within a distance of 1.25±0.125 mm before the smallest circle of confusion, as seen in the direction of propagation of the laser beam 46. The intensity of the laser beam in the test volume was at least $10^{10}$ W/cm$^2$. The dimensions of the test volume transverse to and along, respectively, the direction of propagation were 100×80×250 μm. The high rate of ionization not only makes possible quantitative measurements but also greatly increases the sensitivity, permitting practically non-destructive surface analysis because only a minute amount of material has to be removed from the surface.

Figure 6:
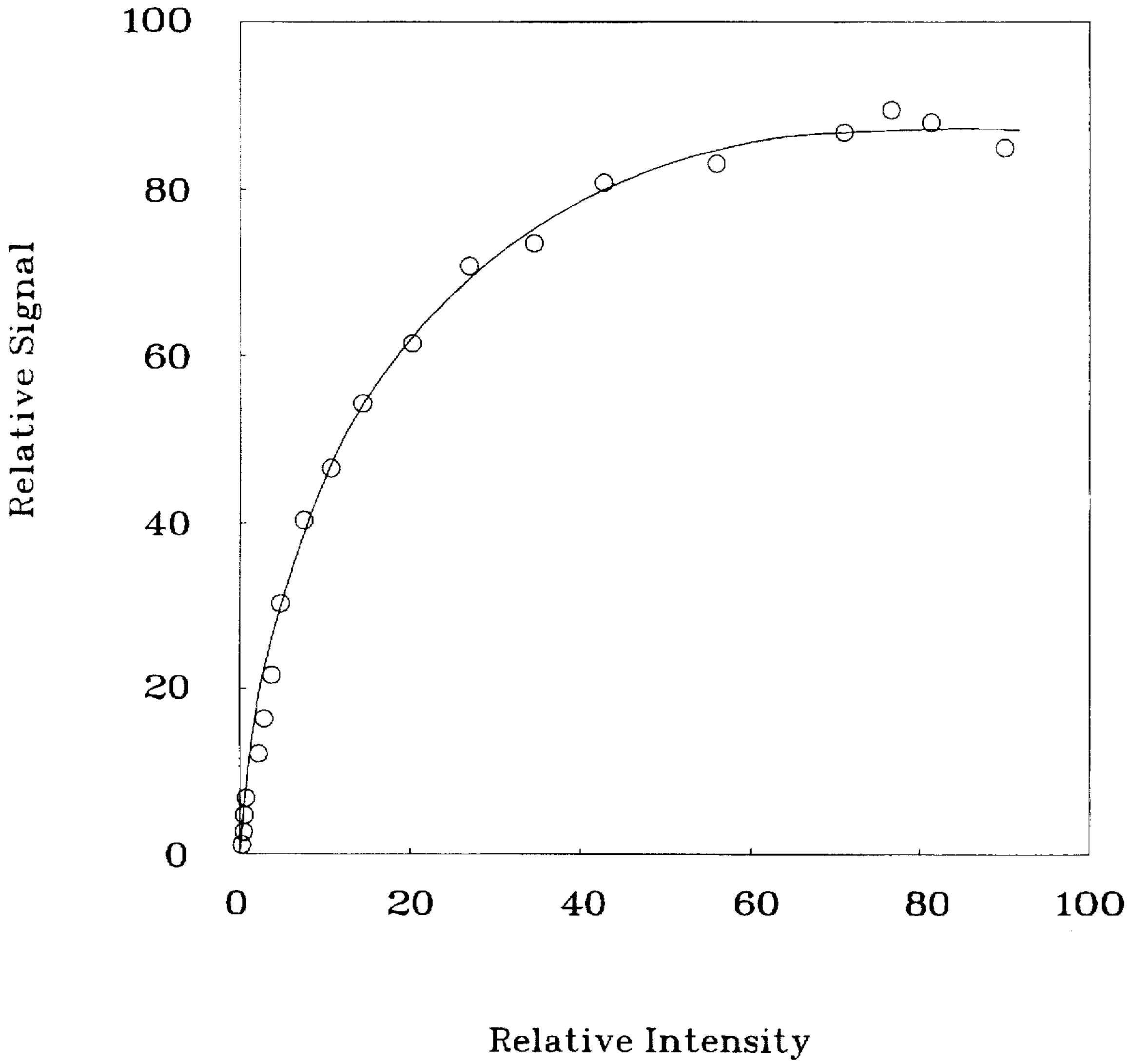
FIG. 6 is a diagram showing the dependence of an ion signal on the intensity of an ionizing laser beam.

FIG. 6 shows the dependence of the ionization signal on the laser intensity for a copper probe. The measured curve was obtained with the arrangement described above. The occurrence of a saturation plateau at high laser intensities is clearly discernible.

In summary, it can be stated that if the laser beam profile does not have very steep lateral intensity gradients, true yield saturation will be reached at a definite laser intensity only if the collection volume of the spectrometer is restricted to a region that can be completely loaded with an intensity above the saturation value.

Figure 7:
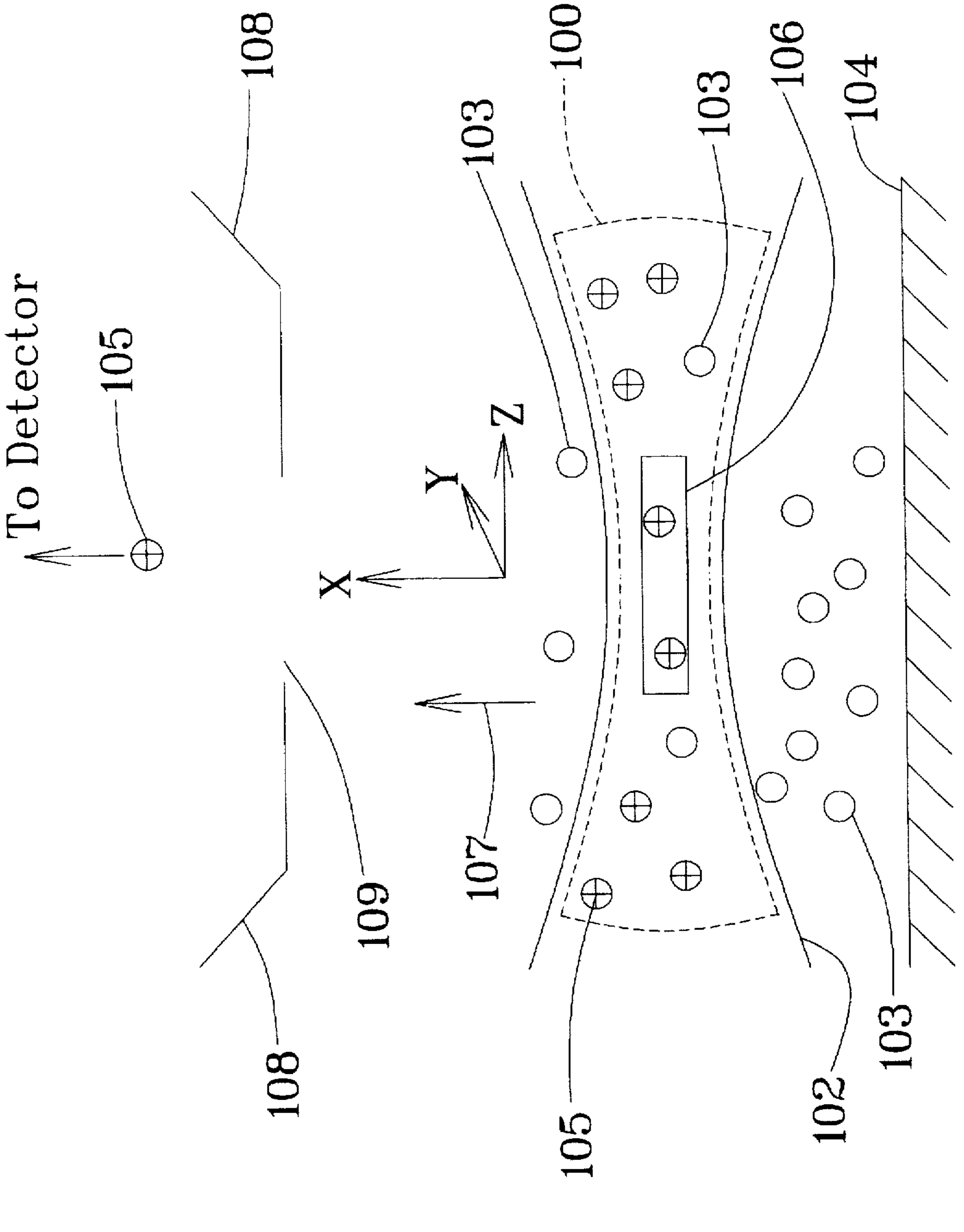
FIG. 7 is a schematic view of the entrance region of another embodiment of MPI-TOF mass spectrometer according to the invention.

To illustrate some of the essential features of such a space limitation according to the invention, the geometry of the entrance region of an MPI-TOF mass spectrometer system is shown in FIG. 7. A certain region or ionization volume 100 of a cloud of neutral atoms 103 (gas species, sputtered particles) is ionized by a focused laser beam 102. Conventionally, all available particles, including ions 105 and non-ionized neutrals 103 in the acceptance volume are collected for mass analysis via a potential gradient 107 between a repeller electrode 104 which can be the sputter target, and the entrance of the ion drift tube 108. The invention enables the collection of particles for mass analysis to be confined to a selected group of higher energy, fully ionized particles.

The goal is to reduce the acceptance range of the spectrometer to a small sharp-edged interval within the laser beam. The apparatus described with reference to the embodiment of FIGS. 7 and 9 of the invention enables progress to be made towards this goal. A novel four-grid electrostatic ion reflector is used in this embodiment of the invention to confine the acceptance volume of a TOF mass spectrometer enabling quantification of MPI yields.

For each specific charge the new TOF instrument generates two ion bunches representing ions from inside and outside a sharply limited acceptance volume of the spectrometer, respectively. The formation of two bunches which are well separated in time is achieved with a step-like flight time dispersion function provided by a double grid in the ion mirror. By choosing the separation of the two peaks produced by the two ion bunches to be from about 0.2 to about 0.3 percent of the ion's total flight time an acceptable compromise is achieved between mass resolution, peak separation and sensitivity of the system. The space confining capability of the instrument can be demonstrated by the saturated multiphoton ionization of sputtered iron and tantulum. In both cases a substantially absolute saturation of the ion yield can clearly be accomplished. The capabilities of the new instrument are further illustrated herein by measuring quantitatively the competition between $Ta^+$ and $Ta^{++}$ MPI yields in terms of increasing laser intensities.

Clipping the collection region in a plane perpendicular to the ion's flight direction (Y-Z plane) can be achieved by placing a suitable field stop (for example entrance aperture 109) within the ion's path. In contrast to this simple method any limitation in drift direction has to be defined either by the laser beam profile itself (e.g. confinement of the ionization volume) or by energy dispersive means (e.g. confinement of the acceptance volume).

According to FIG. 7 the ionization volume 100 is sketched with a dashed line as a sharp edged sector. If the edges of the laser beam profile are not very steep, the ionization volume 100 increases with increasing laser intensities. Accordingly, the ion yield does not saturate. Only if the acceptance range of the spectrometer is within an area where laser intensity I exceeds the saturation value, can absolute saturation of the ion yield be observed. To this end, as shown in FIG. 7, the acceptance range is limited to a well-defined, preferably rectilinear, confined volume 106, within such an area of high laser intensity.

Figure 8:
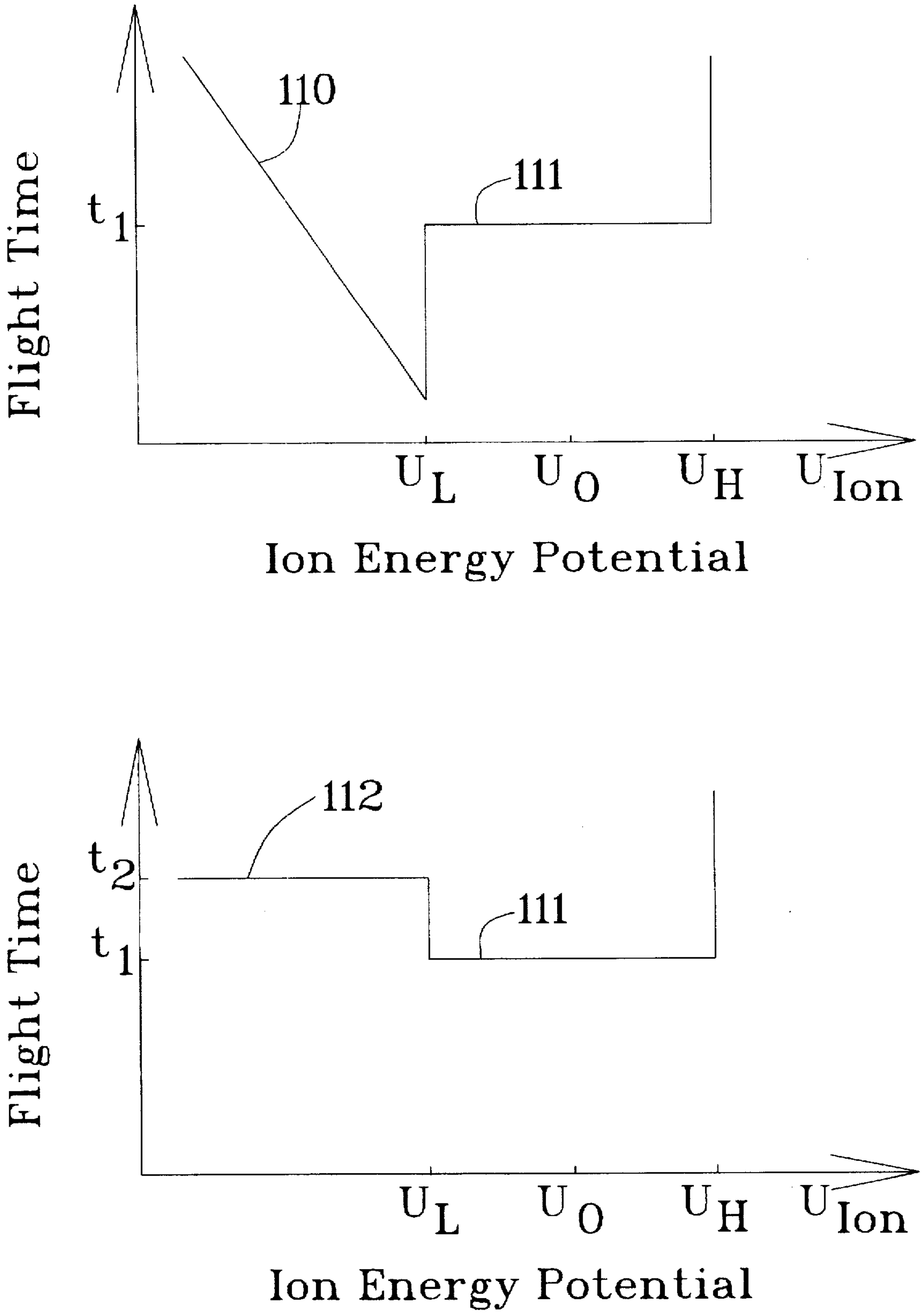
FIG. 8 shows idealized flight time dispersion curves in the mass spectrometer of FIG. 7 for discriminating low energy ions.

The ions generated by the laser pulse are collected via the potential gradient between the repeller electrode 104 and the entrance of the ion drift tube 108. Ions originating at different X-positions differ by their translation energy gained from the acceleration before entering the drift tube 108. This means that information on the position at the moment of the ion's origin can be obtained from a suitable energy selection. The energy selecting properties of a TOF spectrometer are characterized by the flight time dispersion curve, e.g. the dependence of an ion's flight time on its initial energy. Referring to FIG. 8, in both the upper and lower curves flight time $t_1$, increases along the ordinate while ion energy potentials $U_{ion}$ increase along the abscissa with $U_H$ as a high potential. The low energy portion 110 of the upper curve shows (in idealized manner) how the flight times of the low energy ions are uniformly distributed over a large time interval, while higher energy ions are focused in a first ion bunch with a flight time $t_1$ shown by flat portion 111 of the curve. In contrast, the corresponding low energy portion 112 of the lower curve shows, again in idealized manner, the low energy ions are now focused to a second ion bunch with a flight time $t_2$, while the higher energy ions are still bunched with time $t_1$, again shown by flat portion 111 of the curve. It is thus the energy discrimination capability which is of utmost relevance for confining the acceptance volume: A sharply limited X-range confinement will be achieved if the TOF spectrometer is capable of defining a sharp-edged energy acceptance interval.

Figure 9:
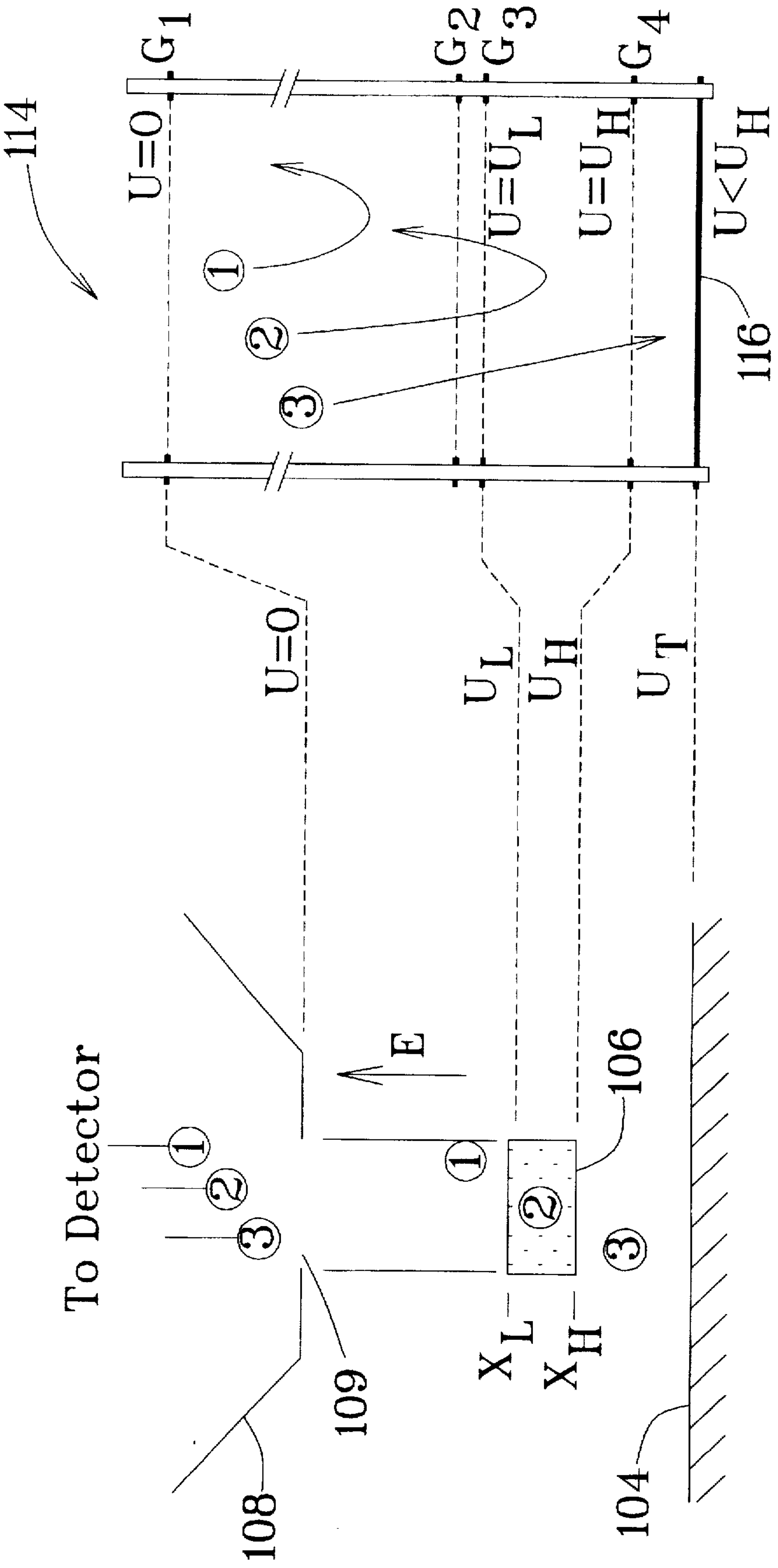
FIG. 9 has a left panel which is a schematic sectional view, to a reduced scale, of the spectrometer entrance shown in FIG. 7 and a right panel which is a relatively enlarged schematic view of an ion mirror employed at the spectrometer entrance shown at the left.

As shown in FIG. 9, right panel, a novel electrostatic ion mirror 114 contains a special double grid which produces two ion bunches due to twofold energy focusing of the collected ions. Thus, ions originating respectively, from inside and outside a well defined range in the X-direction, are projected into two separated peaks of the flight time spectrum. By combining this energy dispersive reflectron with a suitable entrance aperture 109 (Y-Z plane) a three dimensional confinement of the acceptance volume of the spectrometer system is obtained.

The broken lines extending between the right and left panels of FIG. 9 indicate effective positions along the X-axis of four grids $G_1$–$G_4$ which comprise ion mirror 114, and are maintained at potentials U of: O, $U_L$, $U_H$ and $U_T$ respectively which potentials decrease toward zero at the ion drift tube 108.

Potentials $U_L$ and $U_H$ are given to grids $G_3$ and $G_4$ respectively. Grids $G_3$ and $G_4$ are positioned at distances $X_L$ and $X_H$, respectively, and define the X-direction limits of confined volume 106. Circled numbers 1, 2, and 3 reference representative ion species originating respectively in front of, within and behind confined volume 106, referring to the X-direction and the perspective of drift tube 108, where they are subject to potentials of: less $U_L$, between $U_L$ and $U_H$, and greater than $U_H$, respectively. These relative positions are shown schematically as being maintained within drift tube 108 and the behavior of such representative ion species in ion mirror 114 is shown by curves labeled with a corresponding circle number 1,2 or 3 in the right panel of FIG. 9.

Assuming a homogeneous electric field E the ions gain X-dependent kinetic energies according to $q \cdot U_{ion} = q \cdot E \cdot X$ (where the $U_{ion}$ is the potential at the ions' origin) before entering the drift tube (see FIG. 9, left panel).

Consequently, the kinetic energies of the ions are an unambiguous measure of their position of origin. Because the X-range to be confined corresponds to a well defined potential interval $[U_H, U_L]$ a suitable dispersion function should separate ions produced inside this potential interval, from those produced outside Discrimination against the high energy ions 3, circled, is as follows:

The last electrode $G_4$ of the ion mirror is implemented as a grid held at voltage $U_H$. Higher energy ions can penetrate through grid $G_4$ and be extracted by collector electrode 116 at a potential less than $U_H$ as indicated by the straight line in the right panel of FIG. 9. However, the simple ion mirror constituted by grid $G_H$ cannot discriminate against the lower energy ions ($U_{ion}<U_L$) which will always be reflected back to the detector or drift tube 108.

As illustrated in FIG. 8, pursuant to the invention there are two possible approaches to separating the lower energy ions, indicated schematically in both panels of FIG. 9 by (circled) from the ions formed within the predefined X-range limits that define confined volume 106 which ions are indicated schematically by 2 circled in both panels of FIG. 9).

(i) One method is to have the instrument focus only the ions generated in the X-range of interest ($U_L<U_{ion}<U_H$) at a time $t_1$ and to smear or uniformly distribute the flight times of the lower energy ions ($U_{ion}<U_L$) over a large time interval. In the mass spectrum these unwanted ions will then form a broad background permitting separation of a sharp ion spectrum resulting from the X-range of interest.

(ii) A second method is to have the instrument focus the ions generated in the X-range of interest at a time $t_1$ and focus the superfluous (e.g. the lower energy) ions at a time $t_2$ being slightly different from $t_1$. In the mass spectrum two well separated peaks will appear which permit a precise classification of the ions with respect to their energy without any confusing background.

Our calculations suggest that in a reflectron instrument such as that disclosed herein, both types of desired time dispersion curves can be achieved by a novel modification of a traditional three-grid ion mirror in which a fourth grid is added. However, because the broad background of time-smeared low energy ions in the first method (i) may detract from the dynamic range sensitivity of the instrument, method (ii) is a preferred method for practicing this aspect of the invention. Although two peaks are obtained for each specific mass, detracting somewhat from an idealized mass resolution, this is not a significant limitation and meaningful quantification of multiple neutral species can be obtained by this second method. Moreover, the presence of two peaks reveals interesting details about the ionization process itself.

In calculating results, it is conventional to assume a value of zero for the translation energy of the neutrals. Preferably, in the practice of the present invention, this assumption is ignored. Consequently it is necessary to account for a shift of the potentials $U_H$ and $U_L$ and hence of positions of origin $X_H$ and $X_L$ due to their added kinetic energy. However, for a spatially homogenous velocity distribution of the neutrals our analysis indicates that the shift of the X-range of interest caused by this effect is conveniently only dependent on the initial energy. Accordingly, the fixing of an acceptance potential interval defines an X-range the extent of which is, surprisingly, independent of the ion's initial translation energy.

In addition, if the translation energy can be kept small compared with $q \cdot U_{ion}$, the X-shift remains negligible so that all ions accepted by the TOF system are collected from nearly the same X-range. We have found that this desirable condition for multi-species quantification is well satisfied for gaseous (some meV) and sputtered (some eV) neutrals if the laser ionized particles are accelerated to at least some hundred eV.

FIG. 5 displays the flight time distribution at an optimal focusing of the peaks if three neighboring mass peaks are considered. This spectrum is simply obtained from a superposition of three flight time distribution curves taking into account that the flight time follows the scaling law $t_F \propto (q/m)^{-1/2}$. The spectrum demonstrated that for ion masses around 100 a.m.u. the peaks resulting from the unwanted ions appear just in between consecutive peaks of the "wanted" ions produced within the selected potential interval $[U_L, U_H]$.

Figure 10:
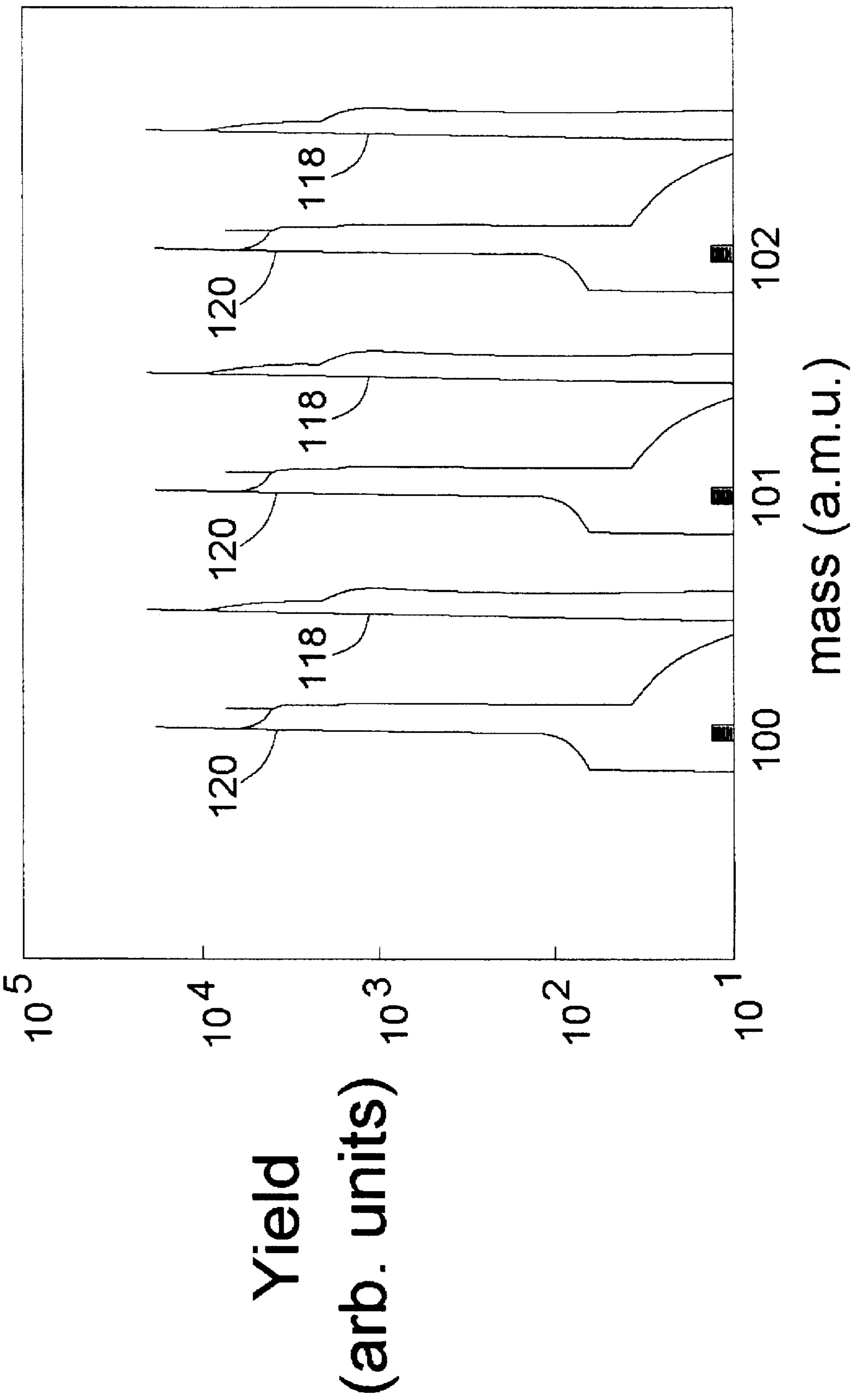
FIG. 10 illustrates in a theoretical manner the potential-sensitive energy-discrimination capabilities of a spectrometer according to the invention and shows a simulated mass spectrum for three hypothetical species.

A suitable beam profile is shown in FIG. 10 which is a simulated at optimum focussing. The origins of hypothetical ion species of masses 100, 101 and 102 a.m.u. are uniformly distributed over the potential interval of from $0.85 \times U_0$ to $1.15 \times U_0$. Thus, the ion generation range considerably exceeds the acceptance potential range. The discriminated peaks 118 resulting from the ions generated outside the confinement range of the spectrometer are well separated from the principal peaks 120 coinciding with the mass number indicators.

A dispersion function yielding twofold or twin peak focusing as described above, can be achieved by utilizing the novel four-grid ion mirror depicted schematically in the right panel of FIG. 9. Grids $G_3$ and $G_4$ specify by their voltages $U_L$ and $U_H$ a potential range for the acceptance volume 106 to be confined. The second grid $G_2$ is mounted about 1 mm in front of the third grid $G_3$ and is held at a voltage slightly below $U_L$, for example, from about 1 to 10, or preferably from about 2 to 5 volts below the potential $U_3$ at grid $G_3$ per 1,000 volts of $U_3$. This novel double grid array provides a well defined flight-time jump for ions with $U_{ion}<U_L$. The extent of the flight time jump was chosen to be approximately 0.25 percent of the total flight time. This means that for a mass of about 100 a.m.u. the peaks of the rejected ions will appear between consecutive mass peaks in the flight time spectrum.

An advantage of the energy discrimination ion-selection method of the invention is that energy discrimination is achieved by the ion itself and no other additional means for energy separation are applied.

The dispersion function of the novel ion mirror 114 is quite sensitive to the electric field and to the distance between the second and third grids. Because this distance has to be kept small in order to obtain a nearly step like dispersion function, two main sources of inaccuracy should be considered in practicing this invention:

(i) field penetration through the grid meshes and (ii) imperfect mounting or tightening of the two grid causing distance variations across the grid area.

To mitigate these problems, grids $G_2$ and $G_3$ and possibly also $G_1$ and $G_4$ can be made from MC-17 copper mesh, 70 lines per inch. At a drift length of 1 m an acceptable compromise between the fading of the dispersion function and the foregoing technical restrictions could be found for a distance between grids $G_2$ and $G_3$ of 1 mm.

Calculations of field penetration as well as tests concerning the grid flatness (achieved by an appropriate tightening strategy) show that, employing the inventive design, these effects need not hinder the systems focusing abilities for masses up to about 200 a.m.u. The focusing characteristics are predominately determined by the curvature of the flight time dispersion function and the pulse length of the excimer laser used for ionization.

In a practical embodiment of the invention, as shown schematically in FIG. 9 a TOF instrument was designed for limiting the acceptance volume to about $\Delta X \approx 200$ µm, and $\Delta Z \approx 2$ mm, referring to FIG. 7 for a definition of the axes X and Z.

Non-resonant MPI simultaneous neutral species quantification experiments can be performed with a Lambda Physics EMG 150 TMSC KrF laser (248 nm, 22 ns FWHM pulse width). In order to obtain about $2 \cdot 10^{12}$ W/cm$^2$ the beam is focused by a double planoconvex lens system (focal length 174 mm) to a beam waist of approximately $\Delta x \cdot \Delta y = 15$ μm·25 μm (FWHM). The ion detection and data acquisition system consists of a Chevron type multichannel plate (Galileo LPD25) operated at a gain of almost $5 \cdot 10^6$, a 10×linear amplifier (LeCroy VV100BTB) and a 200 MHz transient recorder (LeCroy TR8828D/MM8104/6010).

Range confinement in the Y-Z plane is achieved by placing a rectangular beam stop of about 200 μm·2 mm aperture closely adjacent to the entrance of the drift tube. Surprisingly, it was found that since the initial energy of the neutrals is small compared with the kinetic energy gained from the acceleration after ionization, this simple arrangement provides a sufficiently sharp edge-confinement perpendicular to the axis of the drift tube for the multi-species quantification purposes of the present invention.

For a typical distance of 3 mm between ion drift tube entrance aperture 109 and repeller electrode 104, and a laser beam axis-repeller electrode 104 distance of 1 mm, the normalized potential difference $(U_L - U_H)/U_O$ ($U_O$ is the potential at the laser beam axis) should be ≈0.1 in order to yield the desired $\Delta x \approx 200$ um confinement and it is preferred that the inventive ion mirror design meet this requirement.

An exemplary set of suitable geometrical and electrical parameters of a TOF spectrometer useful for MPI quantitive determinations of multiple neutral species is given in the following Table.

TABLE 1

| | |
|---|---|
| Drift length | 1 m |
| Entrance aperture | 0.2 mm × 2 mm |
| Distance target-spectrometer entrance | 3 mm |
| Free diameter of the ion mirror | 45 mm |
| Distance between grids: | |
| $G_1$–$G_2$ | 260 mm |
| $G_2$–$G_3$ | 1 mm |
| $G_3$–$G_4$ | 30 mm |
| Target potential | 1500 v |
| Potential $U_0$ at laser beams axis grid potentials | 1000–1010 v |
| Grid Potentials: | |
| $U_1$ (grounded) | 0 |
| $U_2$ | 942–945 v |
| $U_3$ | 946–949 v |
| $U_4$ | 1060 v |

Figure 11:
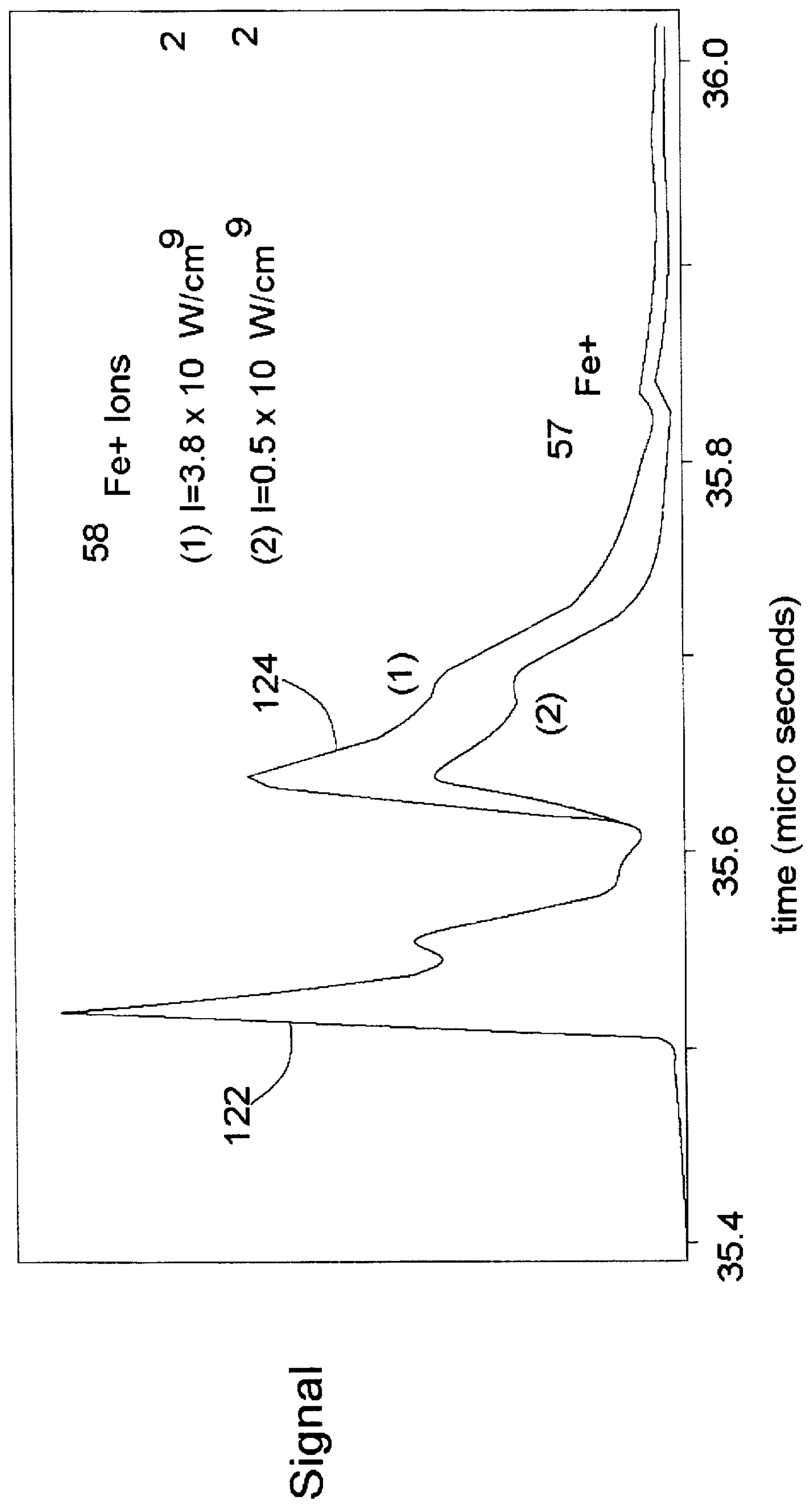
FIG. 11 are spectral curves for $Fe^+$ obtainable with a spectrometer as shown in FIG. 9.

The capability of a spectrometer instrument as shown in FIG. 9 to separate ions into a higher energy bunch 122 originating in the confined region and a lower energy bunch 124 generated in the surroundings of the confined region, can be clearly demonstrated experimentally as shown in FIG. 11. Here flight time spectra of $Fe^+$ ions are recorded for different laser intensities. In the confined volume, ion bunch 122, the ion yield is independently of intensity indicating "absolute" saturation. The second ion bunch 124 from outside the confined region exhibits a more "normal" intensity dependence. Laser-ionization iron atoms sputtered from stainless steel target are collected by the TOF system from a region 4 mm in front of the laser beam waist. At this position the X-dimension of the laser beam converts all approximate interval such that $\Delta X \approx 250$ μm.

Iron TOF spectra are shown for two different laser intensities, curves 122 and 124 demonstrates that variation of the laser intensity only affects the yield of the dispensable or undesired ions from the wings of the laser beam. In particular, the yield in the first peak resulting from ions collected from the confined volume remains constant, while that in the second peak shown a marked intensity dependence indicated by the divergence between curves 122 and 124.

Figure 12:
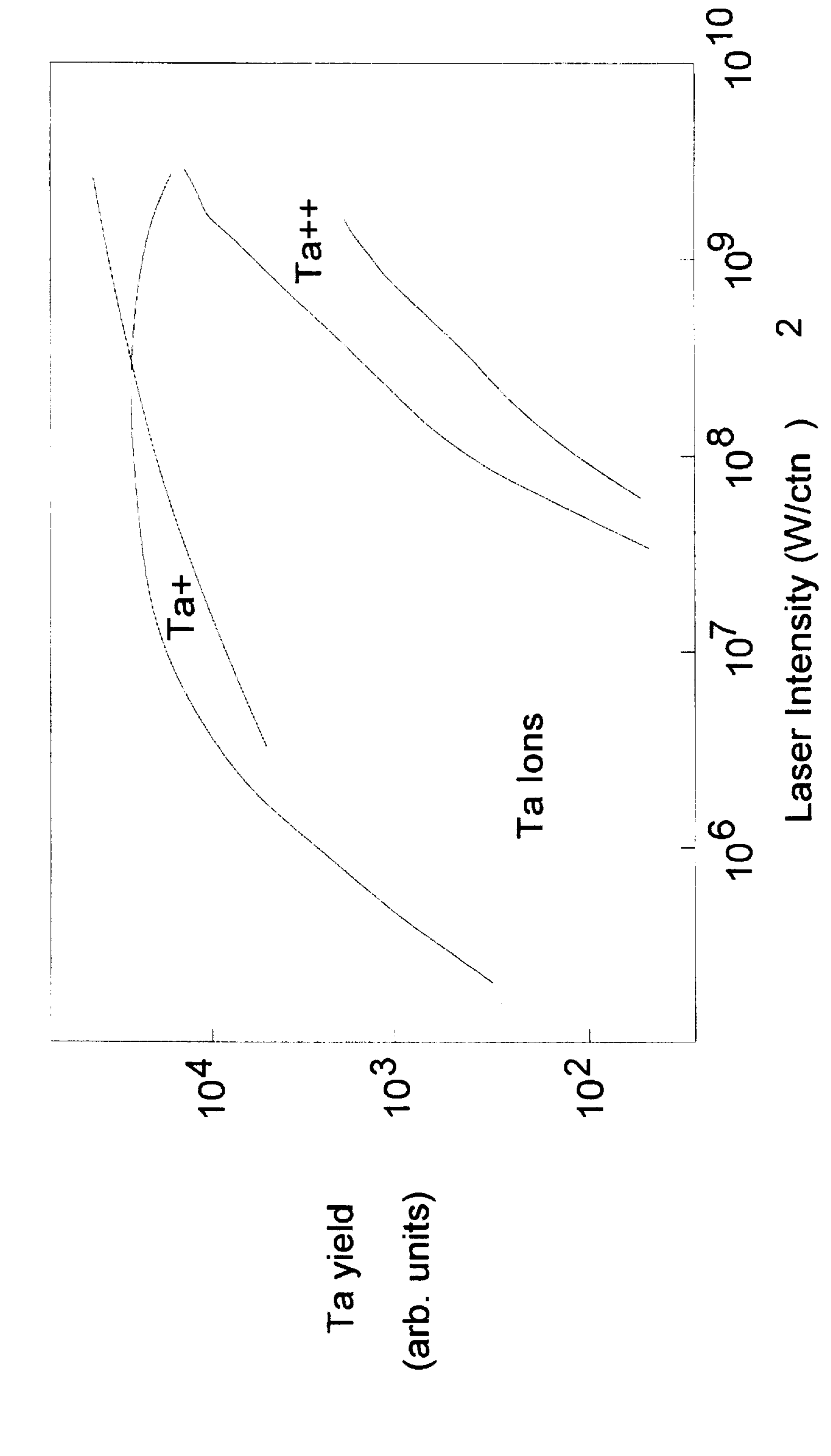
FIG. 12 shows the ion yield plotted against laser intensity for multiphoton ionization of sputtered tantalum as may be determined by a mass spectrometer such as that shown in FIGS. 7 to 9.

FIG. 12, showing ion yields in the multiphoton ionization of tantalum presents information concerning the particle balance in a multiphoton ionization process. With tantalum, the generation of doubly charged ions is a very efficient process yielding a significant saturation of $Ta^{++}$ already at an intensity comparable to the saturation intensity for singly charged ions.

Referring to FIG. 12, the upper pair of curves, labeled "$Ta^{+}$", shows the yields of singly charged tantalum ions from a higher energy ion bunch 122 originating within the confined volume, and a lower energy ion bunch 124 originating outside the confined volume. The lower pair of curves labeled "$Ta^{++}$", shows the respective yields of doubly charged tantalum ions.

The upper and lower curves for higher energy ion bunches 122 from within the confined volume are washed with crosses, and the corresponding curves for lower energy ion bunches 124 are washed with circled crosses.

The curves show that, at a laser intensity of approximately $10^7$W/cm$^2$ the $Ta^+$ production is saturated and the yield no longer increases. Further intensity increases result in the production of $Ta^{++}$ ions, at the expense of the $Ta^+$ yield. Thus, curve 122 falls as curve 124 rises. Correcting the data for the different detection probabilities of $Ta^+$ and $Ta^{++}$ in the multichannel plate, reveals a constant total ion yield accumulated from within the confined volume additive the two curves 122 (noting the logarithmic scales). In contrast the yields for both $Ta^+$ and $Ta^{++}$ from outside the confined volume, upper and lower curves 124, continue to increase with increasing laser intensity. In a conventional SALI system, lacking confinement of the extraction volume, expansion of the ionization volume causes an unremitting increase of the $Ta^+$ yield which increase would overshadow the losses caused by the increasing $Ta^{++}$ fraction.

The surprisingly low saturation intensities, commencing about $10^7$W/cm$^2$, for iron and tantalum may be due to a high density of optical transitions close to the laser wavelength (possibly with a participation of excited initial states resulting from the sputtering process). This effect provides resonance enhanced multiphoton ionization. Such speculation as to a participation of resonant transitions is supported by experimental observations that the ion yield includes a notable fraction of $Ta^+$, but not of $Fe^{++}$, at moderate intensities. The $Ta^+ \rightarrow Ta^{++}$ transition exhibits resonant states close to the laser wavelength of 248 nm, whereas no such transition states near the laser wavelength are provided by $Fe^+$ ions.

Disclosures relating to the present invention were published in a paper entitled "A novel four grid ion reflector - - - ". This paper was authored by two of the inventors herein and published in the International Journal of Mass Spectrometer and Ion Processes 128 (1993) 31–45 not earlier than Sep. 23, 1993, and the disclosure therein is hereby incorporated herein by reference thereto.

While some illustrative embodiments of the invention have been described above, it is, of course, understood that various modifications will be apparent to those of ordinary skill in the art. Such modifications are within the spirit and scope of the invention, which is limited and defined only by the appended claims.

We claim:

1. A method for simultaneous quantitative, non-resonant multiphoton ionization and quantification of multiple target species of gaseous neutral particles, each having a multiphoton ionization saturation intensity, said method comprising:

a) simultaneously ionizing said target species of neutral particles by means of a laser beam having an intensity exceeding said multiphoton ionization saturation intensity of each said target species and having a direction of propagation toward a given volume;

b) defining said given volume by a specified range in a transverse direction to said laser propagation direction and by a specified extension in a transverse plane to said transverse direction, said transverse plane being constant over said specified range;

c) extracting ionized particles produced in step a) from said given volume by means of an ion-optical extraction system;

d) detecting ions generated in said given volume independently of ions generated outside said given volume; and e) simultaneously quantifying multiple target species in said independently detected ionized particles extracted from said given volume, by mass spectrographic means.

2. A method according to claim 1 wherein said ion-optical extraction system has an acceptance aperture providing said specified volume-defining extension in said transverse plane and said specified range is defined by effecting said extraction of said ionized particles from an energy acceptance interval in said given volume.

3. A method according to claim 2 wherein said specified range is defined as an energy acceptance interval by energy discriminating said simultaneously ionized particles into a higher energy ion bunch and a lower energy ion bunch with said higher energy ion bunch in said energy acceptance interval in said given volume whereby said higher energy ion particles are ionized to saturation throughout said energy acceptance interval.

4. A method according to claim 3 wherein said energy discriminating is effected by applying a potential gradient to said given volume in said transverse direction to said laser propagation direction whereby ions generated at different positions in said transverse direction differ by their potential energy so that said specified range corresponds to a specified potential energy range defined by an upper potential and a lower potential.

5. A method according to claim 4 wherein said energy discriminating is effected by reflecting said lower energy ion bunch from an ion mirror comprising:

i) a first grid held at zero potential to ground;

ii) a second grid;

iii) a third grid held at said lower potential said second grid being held at a potential slightly less than said lower potential;

iv) a fourth grid held at said upper potential;

and v) a collector.

6. A method according to claim 4 wherein said energy discriminating comprises focusing said higher energy ion bunch in said energy acceptance interval on a detector system for effecting said ion detection step d) at a first specified time and focusing said lower energy ion bunch on said detector system at a second specified time.

7. A method according to claim 1 wherein said neutral ions are metal ions sputtered from a sample surface.

8. Apparatus for simultaneous, quantitative, non-resonant multiphoton ionization and quantification of multiple target species of gaseous neutral particles said multiple species of neutral particles each having an ionization saturation intensity above which ionization does not increase, said apparatus comprising:

a) laser means to generate a laser beam for simultaneously ionizing said target species of neutral particles, said laser beam having an intensity exceeding said multiphoton ionization saturation intensity of each said target species and having a direction of propagation toward a given volume;

b) confining means to define said given volume by a specified range in a transverse direction to said laser propagation direction and by a specified extension in a transverse plane to said transverse direction, said transverse plane being constant over said specified range;

c) an ion-optical system for extracting ionized particles produced in step a) from said given volume;

d) ion detection means for detecting ions generated in said given volume independently of ions generated outside said given volume; and e) mass spectrographic means for simultaneously quantifying said ionized particles extracted from said given volume as said multiple target species.

9. Apparatus according to claim 8 wherein said ion-optical extraction system has an acceptance aperture providing said specified volume-defining extension in said transverse plane and including means to define said specified range by extracting said ionized particles from an energy acceptance interval in said given volume.

10. Apparatus according to claim 9 wherein said confining means comprises energy discriminating means to discriminate said simultaneously ionized particles into a higher energy ion bunch and a lower energy ion bunch with said higher energy ion bunch in said given volume whereby said higher energy ion particles are ionizable to saturation throughout said energy acceptance interval.

11. Apparatus according to claim 10 comprising means to apply a potential gradient to said given volume in said transverse direction to said laser propagation direction whereby ions generated at different positions in said transverse direction differ by their potential energy so that said specified range corresponds to a specified potential energy range defined by an upper potential and a lower potential.

12. Apparatus according to claim 11, wherein said ion-optical extraction system further comprises a repeller electrode, an ion drift tube, an ion mirror and said ion detection means, said ion mirror having disposed along a line passing from said drift tube to said repeller electrode:

i) a first grid held at zero potential to ground;

ii) a second grid;

iii) a third grid held at said lower potential said second grid being held at a potential slightly less than said lower potential;

iv) a fourth grid held at said upper potential; and v) a collector.

13. An energy selection ion mirror useful in apparatus for simultaneous, quantitative, non-resonant multiphoton ionization and quantification of multiple target species of gaseous neutral particles said multiple species of neutral particles each having an ionization saturation intensity above which ionization does not increase, said apparatus comprising confining means for defining a given volume within which said target species are ionized by a laser beam, an ion detection means for detecting ions generated in said given volume independently of ions generated outside said given volume and mass spectrographic means for simultaneously quantifying said ionized particles extracted from said given volume as said multiple target species, said ion mirror being usable to discriminate collected ions originating from inside and outside said given volume into two ion bunches separated in a flight time spectrum, and having, disposed along a line from said given volume to said ion detection means:

i) a first grid held at zero potential to ground;

ii) a second grid;

iii) a third grid held at a lower potential defining a higher energy ion selection range, said second grid being held at a potential slightly less than said lower potential;

iv) a fourth grid held at an upper potential defining said ion selection range; and v) a collectors;

whereby said collected ions are subject to twofold energy focussing.

* * * * *